(12) United States Patent
Mehendale et al.

(10) Patent No.: US 7,677,112 B2
(45) Date of Patent: Mar. 16, 2010

(54) CORIOLIS FLOWMETER HAVING CONSTANT VOLTAGE SENSOR

(75) Inventors: Aditya Mehendale, Ruurlo (NL); Joost Conrad Lötters, Ruurlo (NL)

(73) Assignee: Berkin B.V., Ruurlo (NL)

( * ) Notice: Subject to any disclaimer, the term of this patent is extended or adjusted under 35 U.S.C. 154(b) by 0 days.

(21) Appl. No.: 12/167,257

(22) Filed: Jul. 3, 2008

(65) Prior Publication Data

US 2009/0013800 A1    Jan. 15, 2009

(30) Foreign Application Priority Data

Jul. 12, 2007    (NL) ................................. 1034125

(51) Int. Cl.
*G01F 1/84*    (2006.01)
(52) U.S. Cl. ................................. 73/861.355
(58) Field of Classification Search .................. None
See application file for complete search history.

(56) References Cited

U.S. PATENT DOCUMENTS 5,111,156 A    5/1992    Hachiuma

2003/0097881 A1*    5/2003    Schlosser et al. ........ 73/861.355
2006/0042402 A1*    3/2006    Bell et al. .............. 73/861.357
2007/0033793 A1*    2/2007    Schlosser et al. ............. 29/428
2008/0115588 A1*    5/2008    Zwikker et al. ........ 73/861.355
2008/0148868 A1*    6/2008    Mehendale et al. .... 73/861.355

FOREIGN PATENT DOCUMENTS

EP    1 719 983 A1    11/2006
WO    03/044814 A1    5/2003

* cited by examiner

Primary Examiner—Harshad Patel
(74) Attorney, Agent, or Firm—Young & Thompson

(57) ABSTRACT

Coriolis mass flowmeter with a Coriolis tube and with an optical detection device, which optical detection device includes at least one optical sensor for generating a signal that is representative of the movement of the Coriolis tube, the optical sensor comprising a light source and a photosensitive sensor, wherein the optical detection device includes elements for applying a constant voltage across the photosensitive sensor during operation independently of the current generated by the photosensitive sensor in response to incident light, as well as elements for determining the value of the current generated by the photosensitive sensor and converting it into an output signal.

15 Claims, 3 Drawing Sheets

CORIOLIS FLOWMETER HAVING CONSTANT VOLTAGE SENSOR

The invention relates to a flowmeter operating by the Coriolis principle, comprising a Coriolis tube and at least one optical detection device, which optical detection device comprises an optical sensor for generating a signal that is representative of the movement of the Coriolis tube, said optical sensor comprising a light source and a photosensitive sensor, wherein the Coriolis tube or a projection fastened to the Coriolis tube moves through the light path between the light source and the photosensitive sensor during operation.

The optical detection device may comprise one optical sensor, but it generally comprises a first and a second optical sensor, or even a first, a second, and a third optical sensor, for generating on the basis of the displacement signals measured by the sensors a signal that is representative of the flow.

The optical sensor used for measuring the displacement in a flowmeter or flow controller based on the Coriolis principle will also be denoted 'opto' hereinafter. It comprises a light source, often an LED, and a photosensor, often a photodiode (or a phototransistor).

The known method of continuously generating a displacement-dependent electrical signal by means of an opto proceeds as follows: an object arranged between the light source and the photosensor blocks out part of the light beam. When said object moves, the quantity of light incident on the photosensor will change. The light sensor acts as a photon counter, the current through the sensor being proportional to the quantity of incident light. A displacement-dependent voltage is generated in that a resistor R is connected in series with the photosensor. A high resistance value should be chosen in order to make this voltage as high as possible.

It turns out however, that when using one, two or three opto's in the conventional flowmeters, the accuracy of the measuring instrument sometimes lags behind the expectations.

An object of the invention is to render the accuracy as large as possible without detracting from the resolution of the instrument. The Coriolis flowmeter according to the invention is for this purpose characterized in that the optical detection device comprises means for applying a constant voltage across the photosensitive sensor during operation independently of the current generated by the photosensitive sensor in response to incident light, as well as means for determining the value of the current generated by the photosensitive sensor and converting it into an output signal. In general, an optical detection device as described above is further provided with an A/D converter for converting the output signal into a digital signal.

A photodiode always has a certain parasitic capacitance C. In combination with the resistance R this constitutes an R-C network with a time constant $T=R*C$. This time constant increases as R increases. Given an electrical signal that changes periodically (for example sinusoidally) caused by a vibrating object between the light source and the photosensor, this time constant will cause a shift of the sine over the time axis, i.e. a phase rotation.

If the parasitic capacitance is constant, it can be compensated for once and for all through calibration. In practice, however, this capacitance shows a drift owing to temperature effects and aging among other factors. It can be calculated that the drift occurring in the time constant of an accurate flowmeter, given a normal choice of photosensor plus resistance, is of a magnitude such that a significant measuring error will result therefrom.

The general principle of the invention now is that the voltage across the opto is kept constant by means of an electronic circuit irrespective of the quantity of light that is incident on the photosensor, i.e. independently of the current through the sensor. As a result of this, the parasitic capacitance is not 'charged' or 'discharged' and accordingly there is no time delay. The output signal of the electronic circuit (voltage or current) here is a measure for the current through the photosensor and accordingly for the quantity of incident light.

The simplest form of such a circuit is the 'volt-to-volt' voltage amplifier, of which there are many versions. Used here is not a high, but a low resistance value R, so that the time constant $T=R*C$ remains small. The drawback of this is that this amplifier always has temperature-dependent capacitances, and thus a temperature-dependent time constant. Furthermore, a voltage amplifier always has a high input impedance so that it is not the input voltage—as desired—but instead the input current that is kept constant.

A preferred embodiment is characterized in that the means for applying a constant voltage across the photosensitive sensor during operation comprise a transimpedance amplifier.

This preferred embodiment ensures in particular that the voltage across the opto is kept constant by means of an 'ampere-to-volt' transimpedance amplifier. The latter does not have the drawback of a high input impedance and for this reason is used inter alia in optical communication amplifiers for substantially eliminating the effects of parasitic capacitances. This is achieved by means of a low input impedance so that—as desired—the input voltage is kept constant. The variation in the input current will then be the basis for the output (voltage) signal of this amplifier. There are various embodiments of the transimpedance amplifier in existence.

In a further embodiment, an operational amplifier (op-amp) with feedback is used, as will be explained further below.

Operation of the Transimpedance Amplifier Circuit

An operational amplifier or op-amp with feedback is used. An op-amp is an active electronic component, usually in the form of an IC, with a very high gain factor. The op-amp drives its negative input to a voltage that is to become equal to the voltage V_bias applied to the positive input. Since said negative input is coupled to the opto, the voltage across the opto will also be constant—as desired—and indeed sufficiently high for giving the opto a bias voltage. Incident light causes a current to flow through the opto. This current now flows through the loop formed by the path through the negative input of the op-amp to the output and then back again through a feedback resistor Rf. The output voltage of the op-amp thus becomes proportional to the current through the opto, as follows:

$$V\_output = V\_bias + (Rf * I\_sensor)$$

The phase rotation of the opto can be reduced by a few orders of magnitude in comparison with the original situation in that a 'fast' op-amp is chosen. i.e. one having a small internal phase rotation.

Eliminating the Voltage Offset

The transimpedance amplifier leads to a voltage offset. The offset consists of a constant DC voltage that contains no relevant information. Such an offset is unfavorable if the output signal is to be subsequently converted from analog to digital in an A/D converter for the purpose of signal processing. A 'normal' unipolar A/D converter starts from 0 V, which means that, given a V_bias of e.g. 12 V, the 'lower region' of the range is not utilized. As a result, the maximum achievable resolution of the A/D converter is not used to advantage.

An embodiment of the Coriolis flowmeter according to the invention is characterized in that the voltage offset is reduced or eliminated by means of 'analog' electronics prior to the A/D conversion, such that the lower region of the range of the A/D converter can be usefully employed.

There are a number of different methods of achieving the above. Often simple, basic electronic circuits are used, which will be explained below.

Basic Circuit

The voltage offset can be reduced in that an extra reference voltage V_bias2 and an extra resistance Ro are added to the basic arrangement.

The average current that flows through the opto is supplied from a second voltage source V_bias2, not from the op-amp. This means that the op-amp need only supply the variation, so that V_bias becomes the average of V_output, not the lower limit thereof. The voltages may be chosen such that the lower limit of V_output becomes approximately 0 V, with the result that the lower region of the range of the A/D converter can be utilized. How the upper region of the range can be utilized will be described further below.

Preferred Embodiment

A disadvantage of the embodiment based on a simple, basic principle as described above is that an additional reference voltage V_bias2 is required. Should this voltage change in relation to V_bias for whatever reason, it will result in an error in V_output. The preferred embodiment does not have this disadvantage, there is only one reference voltage required. This embodiment utilizes a second op-amp that is used as a differential amplifier ('subtractor').

The positive input of the op-amp is for this purpose connected to the output of the transimpedance amplifier mentioned above and the negative input to a bias voltage V_bias. The output voltage of the differential amplifier can be made equal to the difference between the two inputs. Since V_bias is constant, the same result is achieved as with the above simple, basic embodiment.

A desired bias voltage may be realized by means of an additional circuit. This circuit comprises a voltage divider consisting of two resistors that create the desired bias voltage. To this end, a resistor is connected to a supply voltage followed by a second resistor to 0 V. The voltage across the second resistor serves as a source for the bias voltage. The desired bias voltage can be chosen by way of the ratio of the two resistor values. An extra op-amp for adapting the impedance is necessary in order to load this voltage. To achieve this, the output of the voltage divider is connected to the plus input of the op-amp. Then the output of the op-amp is fed back to the minus input of the op-amp. The op-amp is used as a converter from voltage to voltage here and renders possible a sufficient current consumption while the voltage divider is not loaded by the op-amp. As a result of this the voltage created by the voltage divider remains constant, as desired. This circuit renders it possible to employ V_bias usefully elsewhere.

Increasing the Voltage Level

General Principle

If so desired, the output voltage V_output of the op-amp may be further increased by means of a 'volt-to-volt' voltage amplifier in order to profit optimally from the full voltage range of the A/D converter also in the upper region thereof, such that the maximum resolution of the A/D converter is used to advantage. The high input impedance of this amplifier now is an advantage because it keeps the load applied to the input of the previous op-amp limited. This principle can be applied without first eliminating the voltage offset, or alternatively after the voltage offset has been eliminated by one of the methods mentioned above.

The invention relates not only to a Coriolis flowmeter with an optical detection device having one optical sensor that is included in an electrical circuit in one of the manners described above for applying a constant voltage across the sensor during operation. It also relates to optical detection devices with two, three or more optical sensors that are each included in an electrical circuit in one of the manners described above for applying a constant voltage across the sensor during operation.

A few embodiments of the invention will be explained in more detail with reference to the drawing, in which:

FIG. 1A diagrammatically shows an embodiment of a Coriolis flowmeter;

FIGS. 1B-D show an optical sensor, its operation, and part of a Coriolis tube with two optical sensors, respectively;

FIG. 2 is a diagram representing the basic principle of an optical detection device;

FIG. 3 is a circuit diagram of an optical detection device with an op-amp (with feedback);

FIG. 4 is a circuit diagram of the optical detection device of FIG. 3 with added thereto a resistor and an extra reference voltage for reducing the voltage offset;

FIG. 5 is a diagram of a circuit for reducing the voltage offset by means of an op-amp differential amplifier;

FIG. 6 is a diagram of a circuit for generating a stable reference voltage Vbias;

FIG. 7 shows how the partial diagrams of FIGS. 3, 5 and 6 are joined together into a complete circuit diagram; and FIG. 8 shows an embodiment of an optical detection device suitable for use with the device according to the invention.

Figure 1A:
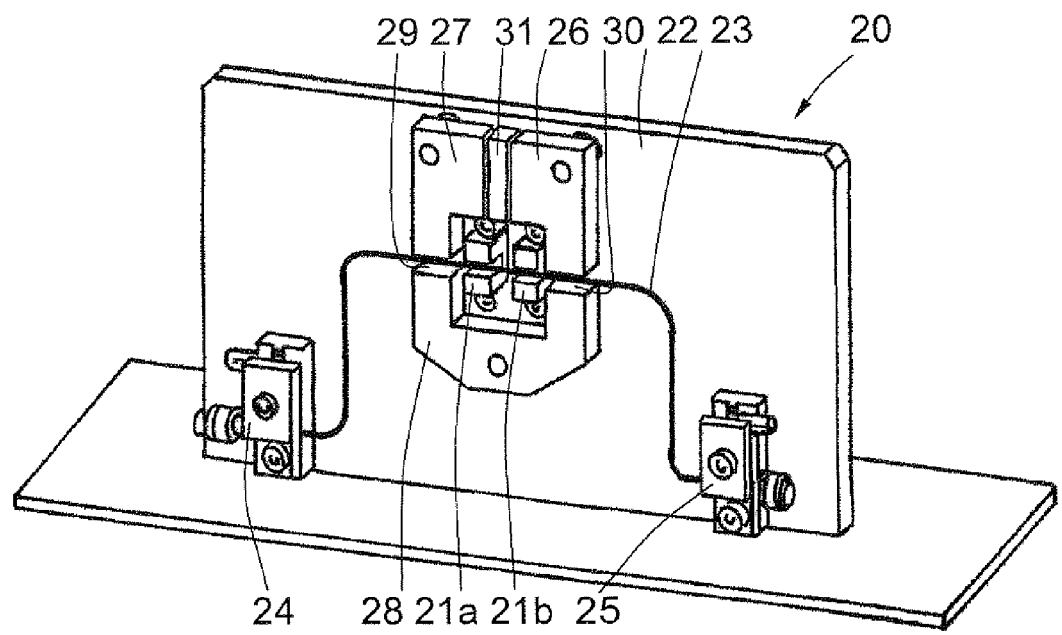
FIG. 1A shows an embodiment of a Coriolis flowmeter 20. It is provided with a frame having a base plate 22 which supports a tube 23 through which a medium flows during operation. The tube 23 is a looped tube in this case with a half turn (U-shaped tube), but it may alternatively be a straight tube or a looped tube comprising a full turn (closed loop). Looped tubes are preferred because they are more flexible than straight tubes. The tube 23 is fastened to the base plate 22 by fastening means 24, 25. Said means 24, 25 constitute clamping locations relative to which the tube 23 can move. In the context of the invention, the tube 23, which may be made, for example, of stainless steel with a wall thickness of approximately 0.1 mm and a diameter of approximately 0.75 mm, is of a very lightweight construction that can be brought into resonance with little energy. Depending on the outer dimensions of the loop shape and the pressure the tube 23 is to be able to withstand (for example 100 bar), the outer diameter of the tube 23 will generally be smaller than 1 mm and its wall thickness 0.2 mm or less.

As FIG. 1A further shows, a permanently magnetic yoke 26 consisting of two U-shaped halves 27, 28 separated by air gaps 29, 30 is used for exciting the tube 23. Part of the tube 23 is passed through these air gaps. A permanent magnet 31 is arranged in the path of the yoke 26 with its North and South poles oriented such that a circulating magnetic field arises in the yoke 26, mutually opposed magnetic fields of equal strength being generated in the air gaps 29, 30. When an electric current is sent through the tube 23 in the direction from the fastening means 24 to the fastening means 25, Lorentz forces F (towards the rear) and F' (towards the front) of equal strength will then act on the respective tube parts, reversing their directions when the direction of the current in the tube wall is reversed. This torque excitation causes the tube 23 to perform a reciprocating rotation (vibration) about the main axis of symmetry of the U-shaped tube 23 in the case of an alternating current. Instead of the manner of excitation described above, however, alternative excitation methods may be used as well.

Within the framework of the invention, one or several optical sensors are used for detecting the movement of the Coriolis tube 23. The construction according to FIG. 1A comprises two such sensors referenced 21a and 21b. The optical sensors in the construction of FIG. 1A are placed (within the central opening of the magnet yoke) such that they are capable of cooperating with the tube 23 in a contactless manner. Versions with other numbers of sensors, for example one or three, are also possible.

Figure 1B:
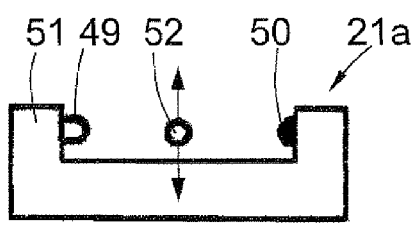

FIG. 1B diagrammatically shows one of the optical sensors used, in this case sensor 21a, in longitudinal sectional view. The sensor comprises a U-shaped housing 51 with a light source 49 (for example an LED) on the inside of one leg of the U and on the inside of the other leg of the U a light-measuring cell 50 (for example a photodiode). The optical sensor 21a is arranged such that a tube portion 52 of the Coriolis tube can move between the legs of the U-shaped housing 51. During operation the tube 52 will cover the light transmission zone between the light source 49 and the measuring cell 50 to a greater or lesser degree. In an embodiment in which the tube is provided with a projection (such as a vane), the tube may be farther removed from housing, and it is the projection that moves between the legs.

Figure 1C:
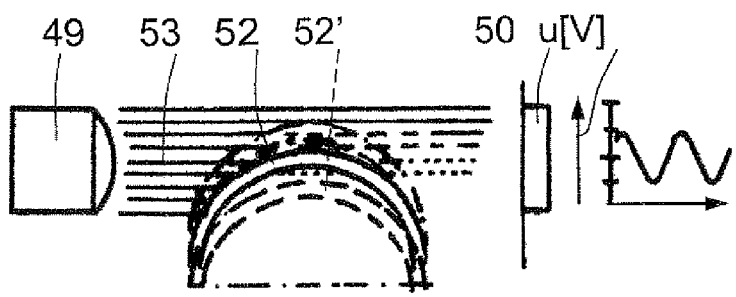

FIG. 1C shows in greater detail how the tube portion during its movement intercepts a greater (position 52) or smaller (position 52') portion of the light beam 53 sent by the light source 49 to the light-measuring cell 50. The light-measuring cell 50 produces a signal u(V) that can be further processed.

Figure 1D:
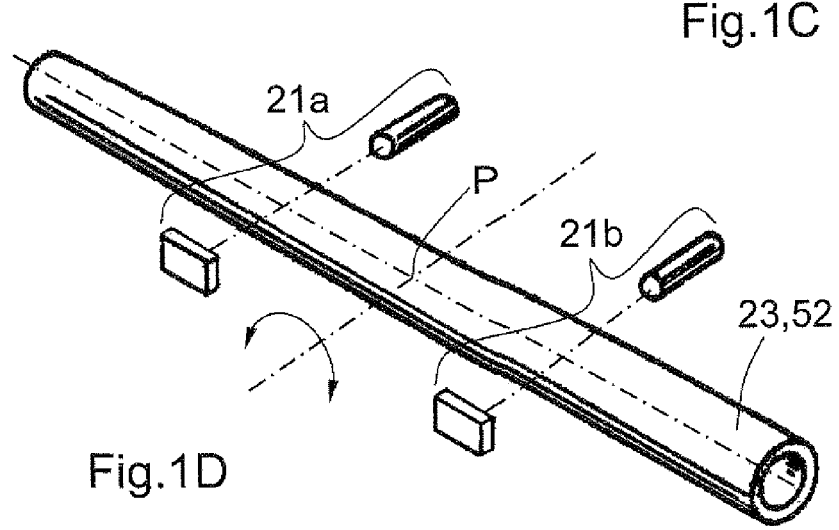

FIG. 1D diagrammatically shows the process of detection by means of two optical sensors 21a, 21b. These are located on either side of and preferably symmetrically with respect to the point where the axis of rotation (i.e. the axis about which the excitation means cause the tube to rotate) intersects the tube portion 23. This point of intersection is denoted the pole (of rotation) P. The sensors 21a, 21b are preferably at a small distance from this pole. Said distance should be sufficiently small for ensuring that the measured contribution of the excitation is of the same order of magnitude as the measured contribution of the Coriolis forces.

In the flowmeter of the Coriolis type as described above, optical sensors are used for measuring the movement of the tube. The quality of the electrically modulated signals from these sensors is adversely affected by the inherent parasitic capacitance of the optical sensors. Additional electronics are used in order to reduce the influence of this capacitance and to improve the quality of the signals further. These electronics are formed by the assembly of a number of constituent circuits and main components as described in more detail below.

Figure 2:
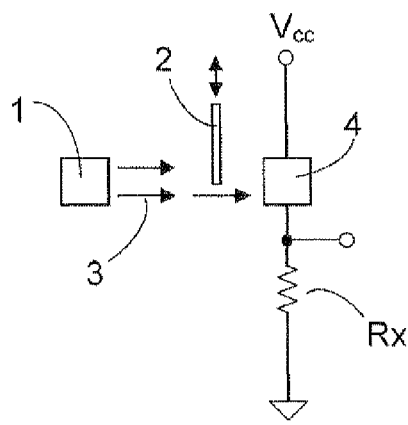

FIG. 2 shows a basic principle of displacement detection. An object 2 placed between a light source 1 and a photosensor 4 intercepts part of a light beam 3. As the object 2 (a Coriolis tube or a projection fastened thereto) moves, the quantity of light reaching the photosensor 4 will also change. The applied supply voltage Vcc ensures that a current can flow through the photosensor. The current generated in the sensor 4 is proportional to the quantity of incident light. Said current is converted by a resistor Rx into the output voltage of the circuit, The output voltage of this circuit is a measure for the position of the object. The problem with this basic circuit is the unknown and variable time constant $T=R*C$ caused by the combination of Rx and the parasitic capacitance C in the optical sensor.

Figure 3:
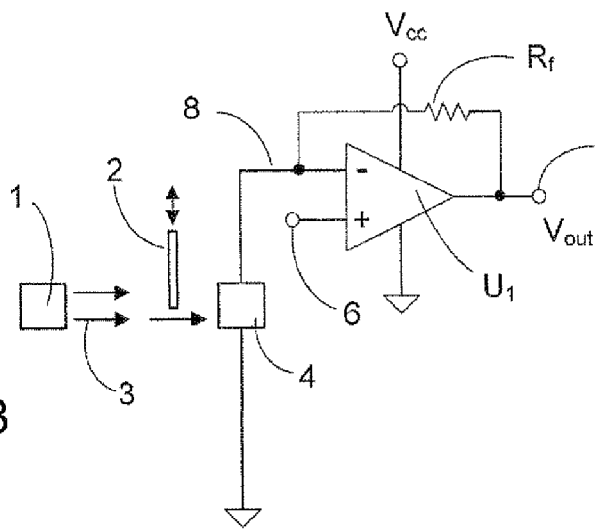

FIG. 3 shows part of the solution to the problem of the parasitic capacitance, i.e. through the use of a transimpedance amplifier according to the invention. The transimpedance amplifier comprises an op-amp U1 which ensures that the optical sensor 4 receives a constant voltage and that the output current of the optical sensor 4 is loaded with a low impedance. This works as follows: the op-amp U1 drives its negative input 8 to a voltage that is to be made equal to the voltage V_bias applied to the positive input 6. Since this negative input 8 is coupled to the opto 4) the voltage across the opto 4 will be constant as well. The current required for keeping this voltage constant is supplied by the op-amp U1, as is desired, and not by the opto 4. This voltage is sufficiently high for giving the opto 4 a bias voltage. The op-amp U1 thus ensures that the optical sensor 4 receives a constant voltage and at the same time is loaded with a low impedance.

Incident light causes a current to flow through the opto. This current now flows through the loop formed by the path via the negative input of the op-amp to the output 7, Vout, and then back through the feedback resistor Rf. The output voltage of the op-amp becomes proportional to the current through the opto in the following manner:

$$V\_output = V\_bias + (Rf * I\_sensor)$$

The transimpedance amplifier of FIG. 3 leads to a voltage offset. Most applications will work with supply voltages from 0 V, for example 0 to 5 V. The voltage V_bias mentioned above should be greater than zero, or else there will be no voltage across the opto. This, however, also gives the output voltage V_output of the op-amp an offset equal to V_bias, in other words, the voltage will never drop below this value. A typical value for V_bias is 1 V.

The actual offset may even be higher than V_bias if the light incident on the optical sensor in the opto never becomes quite zero, so that the latter always delivers a small voltage.

Such an offset is disadvantageous if the output signal is subsequently converted by an A/D converter from analog to digital for further signal processing. A 'normal' unipolar A/D converter starts from 0 V, so that with a V_bias of 1 V the lower region of the range is not effectively used. The maximum achievable resolution of the A/D converter is not utilized as a result of this.

The invention also offers means comprising 'analog' electronics for reducing or eliminating the voltage offset prior to the A/D conversion, so that the A/D converter can be usefully applied right from the lower region of its range.

Figure 4:
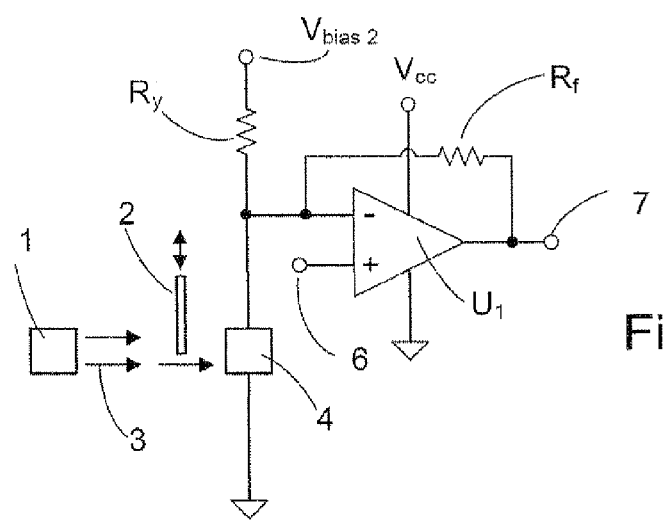

There are a great number of methods of doing this, mostly using simple, basic electronic circuits. A simple principle for reducing the voltage offset is through the addition of an extra reference voltage V_bias2 plus an extra resistor Ry to the equivalent diagram of FIG. 3. This is shown in FIG. 4: reducing the voltage offset by means of an additional reference voltage.

The average current flowing through the opto is now fed from V_bias2 and not from the op-amp. This means that the op-amp need only supply the variation, so that V_bias becomes not the lower limit, but the average of V_output. The voltages may be chosen such that the lower limit of V_output becomes approximately 0 V, so that the lower region of the range of the A/D converter can be utilized. How the upper region of the range can be fully utilized will be described further below.

It is a disadvantage of the basic embodiment based on a simple principle as described above that an extra reference voltage V_bias2 is required. Should this voltage be subject to drift relative to V_bias, the result will be an error in V_output.

Figure 5:
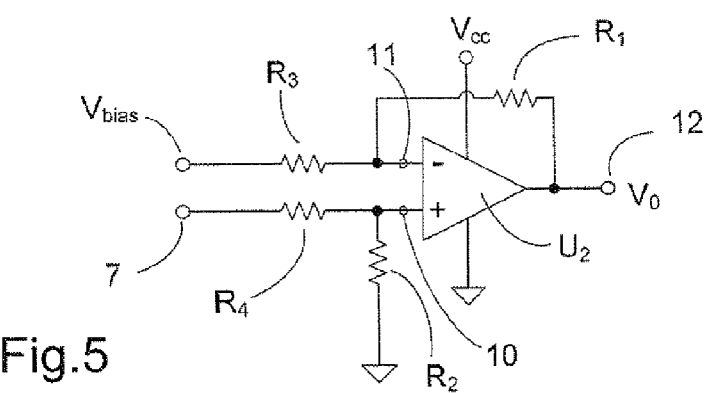

The preferred embodiment shown in FIG. 5 does not have this disadvantage: there is only one reference voltage required. This embodiment uses a differential op-amp ('subtractor') connected downstream of the transimpedance amplifier. The circuit diagram of FIG. 5 shows the principle of reducing the voltage offset by means of a differential amplifier or op-amp U2. The positive input 10 of the op-amp U2 is connected to the output 7 (V_out) of the circuit of FIG. 3 and the negative input 11 to V_bias. When R3 and R4 are chosen to be equal, the output voltage Vo at the output 12 will be equal to the difference between the two outputs 10 and 11. Since V_bias is kept constant, the same result is achieved as with the simple, basic embodiment of FIG. 4.

An additional voltage amplification G=R1/R2 can be realized in the arrangement of FIG. 5 in that a value is given to R1=R2 that is different from that of R3=R4.

Bias Voltage

Figure 6:
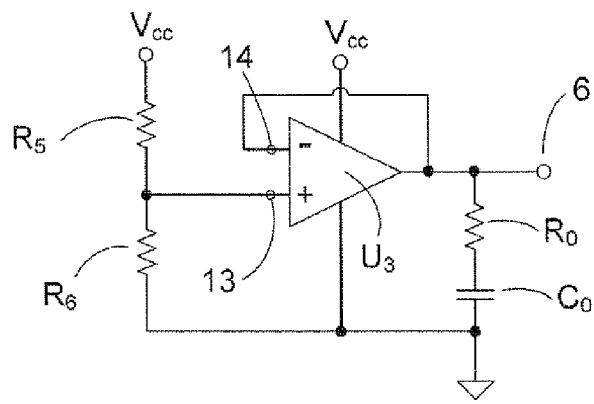

A desired bias voltage can be realized by means of the circuit of FIG. 6. The circuit operates as follows: the applied voltage of the supply Vcc is subdivided as desired by the voltage divider R5, R6. The ratio thereof determines the eventual desired bias voltage. The divided supply voltage as determined by R5 and R6 is offered to the positive input 13 of op-amp U3. The op-amp U3 will now try to keep the voltage at both inputs 13, 14 constant and realizes this by controlling its output such that the same voltage is also at the feedback input 14. Since there is no current entering the op-amp U3 through one of the inputs 13 and 14 in principle, the voltage divider consisting of R5 and R6 is not loaded. The desired voltage is present at the output 6 of the op-amp U3, and any concomitant load can be provided by the op-amp U3. An RC network Ro, Co at the output 6 of the op-amp U3 provides a decoupling from possible interferences from external influences and from the op-amp U3 itself.

Complete Circuit Diagram

Figure 7:
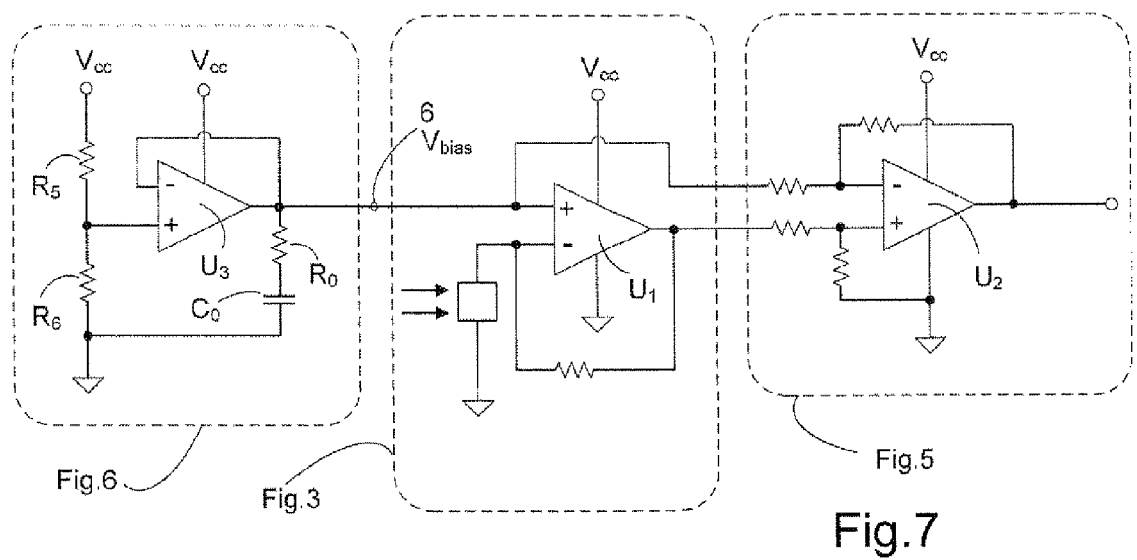

Joining together of the above partial circuits yields the complete circuit diagram of FIG. 7, wherein the op-amp U3 provides a stable reference voltage V_bias via the stable supply voltage Vcc in combination with the voltage divider R6/(R5+R6).

Figure 8:
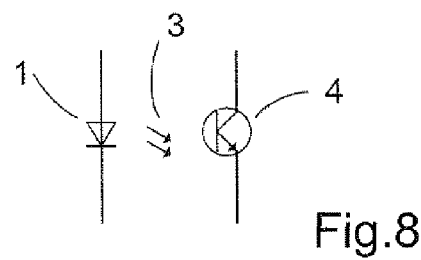

FIG. 8 shows a preferred embodiment of the optical detection unit for use in the mass flowmeter according to the invention. The light source 1 herein consists of an infrared LED, the arrows 3 representing the emitted light, and the light receiver or light-measuring cell 4 consists of a phototransistor. In an alternative embodiment, the light source may be a laser diode or some other type of light source, and the light-measuring cell may be a photodiode or some other type of photosensitive cell. A photodiode is a diode that generates a higher or lower voltage in proportion as more or less light is incident thereon. A phototransistor is a transistor that passes more or less current in dependence on the quantity of light. Both these components can be used within the framework of the invention with a simple adaptation. The preferred embodiment of FIG. 8 comprises in particular a phototransistor because it is present together with the emitting diode, i.e. the infrared LED, in one housing as part of the standard optical component. The light receiver 4 of FIGS. 2 to 6 may thus be a either diode, or a transistor as shown in FIG. 8.

If the light receiver 4 in the diagram of FIG. 2 is a transistor, a voltage is generated across the resistor Rx in the classic detection method also in this case. In combination with the capacitance C, this resistor is responsible for the occurrence of a disadvantageous and variable RC time. In the solution according to the invention described with reference to FIG. 3, reference numeral 4 may denote a transistor that is fed from the op-amp U1, which op-amp U1 also provides a low impedance load.

Summarizing, the invention relates to a Coriolis mass flowmeter or flow controller with a Coriolis tube and with an optical detection device, which optical detection device comprises at least one optical sensor for generating a signal that is representative of the movement of the Coriolis tube, said optical sensor comprising a light source and a photosensitive sensor, wherein the optical detection device comprises means for applying a constant voltage across the photosensitive sensor during operation independently of the current generated by the photosensitive sensor in response to incident light, and means for determining the value of the current generated by the photosensitive sensor and converting it into an output signal, as well as an A/D converter for converting the output signal into a digital signal.

The invention claimed is:

1. A Coriolis mass flowmeter comprising a Conchs tube and an optical detection device, which optical detection device comprises at least one optical sensor for generating a signal that is representative of the movement of the Coriolis tube, said optical sensor comprising a light source and a photosensitive sensor, wherein the Coriolis tube or a projection fastened to the Coriolis tube moves through the light path between the light source and the photosensitive sensor during operation, characterized in that the optical detection device comprises means for applying a constant voltage across the photosensitive sensor during operation independently of the current generated by the photosensitive sensor in response to incident light, as well as means for determining the value of the current generated by the photosensitive sensor and converting it into an output signal.

2. A Coriolis mass flowmeter as claimed in claim 1, characterized in that the means for applying the constant voltage across the photosensitive sensor during operation comprise a transimpedance amplifier.

3. A Coriolis mass flowmeter as claimed in claim 2, characterized in that said transimpedance amplifier comprises an operational amplifier (op-amp).

4. A Coriolis mass flowmeter as claimed in claim 3, characterized in that said op-amp is an op-amp with feedback, having a positive input that is connected to means for supplying a constant bias voltage V_bias and a negative input that is connected to the photosensitive sensor, the op-amp controlling the negative input to a voltage equal to V_bias, while the op-amp has an output that supplies an output voltage proportional to the current through the photosensitive sensor.

5. A Coriolis mass flowmeter as claimed in claim 4, further provided with a 'volt-to-volt' voltage amplifier for increasing the output voltage of the op-amp.

6. A Coriolis mass flowmeter as claimed in claim 3, further provided with a 'volt-to-volt' voltage amplifier for increasing the output voltage of the op-amp.

7. A Coriolis mass flowmeter as claimed in claim 6, characterized in that the differential amplifier is connected to a voltage divider comprising two resistors for realizing a voltage amplification, the ratio of the two resistors defining the amplification factor.

8. A Coriolis mass flowmeter as claimed in claim 3, further provided with analog electrical means for reducing an offset of the output signal before the latter is supplied to the A/D converter.

9. A Coriolis mass flowmeter as claimed in claim 2, further provided with analog electrical means for reducing an offset of the output signal before the latter is supplied to the A/D converter.

10. A Coriolis mass flowmeter as claimed in claim 1, further provided with analog electrical means for reducing an offset of the output signal before the latter is supplied to the A/D converter.

11. A Coriolis mass flowmeter as claimed in claim 10, characterized in that said analog electrical means comprise a differential amplifier.

12. A Coriolis mass flowmeter as claimed in claim 11, characterized in that the differential amplifier comprises an op-amp.

13. A Coriolis mass flowmeter as claimed in claim 12, further provided with a 'volt-to-volt' voltage amplifier for increasing the output voltage of the op-amp.

14. A Coriolis mass flowmeter as claimed in claim 11, further provided with a 'volt-to-volt' voltage amplifier for increasing the output voltage of the op-amp.

15. A Coriolis mass flowmeter as claimed in claim 10, further provided with a 'volt-to-volt' voltage amplifier for increasing the output voltage of the op-amp.

* * * * *